INVENTOR.
JOACHIM SCHUBERT

United States Patent Office 3,555,363
Patented Jan. 12, 1971

3,555,363
EXPOSURE CONTROL CIRCUIT FOR A PHOTOGRAPHIC SHUTTER
Joachim Schubert, Munich, Germany, assignor to Ernst & Wilhelm Bertram Fabrik fototechn. Messgerate, Munich, Germany
Filed Feb. 26, 1968, Ser. No. 708,393
Claims priority, application Germany, Apr. 26, 1967, B 92,255
Int. Cl. H01h 47/24; G01j 1/00
U.S. Cl. 317—124          10 Claims

ABSTRACT OF THE DISCLOSURE

A light exposure control circuit for a photographic shutter, the opening and closing of which is caused by an electromagnet and the exposure time of which is indicated on an electric meter that is energized by a photoresistor and can be switched on by means of a main switch. The exposure time which is to be used can be read on the meter before the release of the shutter and the reading will show whether or not the taking of a picture is possible. A delay circuit is used to determine the exposure time, a capacitor in the delay circuit being charged through the photoresistor with the charge initiating the energizing of the shutter opening magnet and continuing until, at the end of the delay time, the shutter closing magnet is energized.

---

This invention relates to a light exposure control circuit for a photographic shutter, the opening and closing of which is caused by an electromagnet and the exposure time of which is indicated on an electric meter. Such meter is energized by a photoresistor and can be switched on by means of a main switch. Thus, the exposure time which is to be used can be read on the meter before the release of the shutter and the reading will show whether or not the taking of a picture is possible. A delay circuit is used to determine the exposure time, a capacitor in said delay circuit being charged through the photoresistor with said charge initiating the energizing of the shutter opening magnet and continuing until, at the end of the delay time, the shutter closing magnet is energized.

Thus, it is required in such light exposure control circuits, after energizing the meter through the photoresistor, to switch said photoresistor to the delay circuit and at the same time to energize the shutter opening magnet. This has so far required separate switches, one for the shutter opening magnet and one for the joint switching of the photoresistor and delay circuit since the energizing of the delay circuit had to be maintained separate from the energizing of the shutter opening magnet. Sufficiently exact controlled delay times are thereby obtained only if, upon switching to energize the delay circuit and thereby begin the delay time, switching on of the opening magnet also takes place at a closely determinable time. However, it is difficult in practice to control exactly the switching series in jointly operated switches so that any discrepancy in their actuation is short in time with respect to the required short exposure times. The exact exposure time is essentially dependent on the exactness of the operating of such switches.

This invention avoids said difficulties by inserting electronic switching means at certain areas so that only one simple switch is sufficient for releasing the mentioned switching from one circuit to the other and for energizing the shutter opening magnet. According to the invention, this is accomplished by having the circuit branch containing the meter discharge into the circuit branch containing the rectifier with said latter branch being switched on by means of a release switch which is operated after operation of the main switch. The shutter opening magnet is thereby energized. The rectifier is blocked at the same time and thus the current flowing through the photoresistor is fed to the delay circuit, the capacitor of said delay circuit being connected in the circuit branch which is connected between the rectifier and photoresistor.

If in such a circuit the shutter opening magnet is connected to the output side of the rectifier, the voltage drop occurring at the shutter opening magnet when the release switch is operated is used in an advantageous manner for blocking the rectifier.

It is further possible to make the shutter closing magnet dependent on the operation of the release switch so that no separate switch is required, namely, upon operation of the release switch the circuit can be closed in preparation for energizing of the shutter closing magnet.

The drawing illustrates three embodiments of the invention in which.

Figure 1:
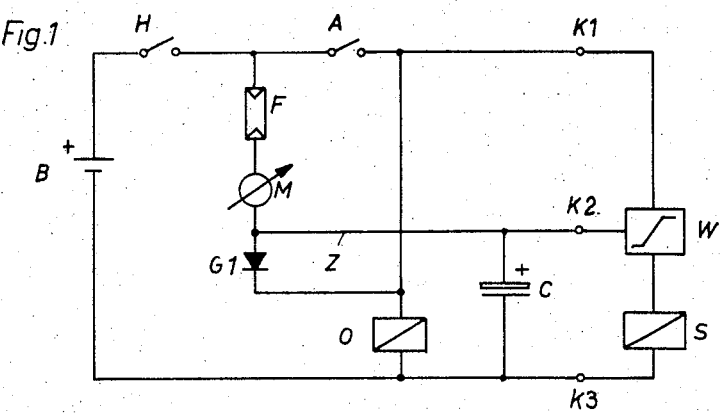
FIG. 1 shows a circuit utilizing the principle discussed above.

The embodiment illustrated in FIG. 1 comprises a battery B for energizing the circuit of the invention, the voltage of said battery being fed to the other elements of said circuit after the main switch H has been closed. A current flows thereby from the battery B through the main switch H, the photoresistor F, the meter M, the rectifier G1, the shutter opening magnet O and back to said battery. The value of said current is determined essentially by the resistance value of the photoresistor F. This value depends on the amount or intensity of light striking said photoresistor which thus gives a reading for the exposure time. In comparison to the value of the photoresistor F, the resistances of the meter M, of the shutter opening magnet O and the forward resistance of the rectifier G1 are negligible. The current thus determined by the photoresistor F causes a corresponding deflection on the meter M, said deflection indicating to the operator of the camera whether or not a picture can be taken and which exposure time should be used for said picture. However, said current is so weak that it is not sufficient to operate the shutter opening magnet.

The branch Z is connected between the meter M and the rectifier G1 and leads to the capacitor C. The latter, together with the photoresistor F, comprises the delay circuit. A continuous increase of the voltage supplied to the capacitor C is caused by means of said delay circuit, which is used to control a known mechanism connected to the terminals K1, K2 and K3 for operating the shutter closing magnet S. Said closing mechanism is illustrated only schematically and forms no part of the invention although its basic effectiveness will be discussed later in more detail. However, it is to be noted that the voltage drop across the rectifier G1 and the shutter opening magnet O resulting from the mentioned current flow is so small that no important charging of the capacitor is achieved. The closing mechanism connected to the terminals K1, K2 and K3 thus remains initially unchanged.

If the trigger of the camera is operated, the release switch A coupled with said trigger is closed. This causes the opening magnet O to receive all of the voltage of battery B, said opening magnet is then energized and causes the opening of the shutter in any known manner, latter is not shown since it is of no importance to the operation of the circuit of the invention. Thus, the side of the rectifier G1 connected to the opening magnet O receives a more positive potential than the other side of said rectifier so that the rectifier G1 is nonconductive, which causes the current flowing through the photoresistor F to be conducted through the branch Z to charge the capacitor C. The time constant of said charging process is directly dependent on the resistance value of the photoresistor F so that the voltage on the capacitor C is dependent directly on the incident light.

In this function it is important that, due to the rapidity of operation of the rectifier G1, such switching of current to the capacitor C occurs at the same time as the closing of the release switch A so that the start of charging operation of the capacitor C, thus the start of the delay time, coincides exactly with the start of the energization of the opening magnet O. The required delay time, which essentially coincides with the opening time of the shutter, can thus be very exactly maintained in all instances.

A closing mechanism is connected to the terminals K1, K2 and K3, which closing mechanism operates when a certain threshold voltage appears on the capacitor C. Release of the switch W, which is operable at the threshold voltage, connects the closing magnet S to the circuit. Since the circuit has been prepared for the shutter closing magnet by operating the release switch A, the closing magnet S is energized upon tripping of the threshold value switch W and thus closes the shutter in any known manner, which will not be discussed in detail in this connection since this is not important for the function of the circuit of the invention. A time period exists between the opening and the closing of the shutter, which time period is determined essentially by the energization of the opening magnet O and the closing magnet S, in other words, by the delay time necessary for the charging of the capacitor C through the photoresistor F.

Figure 2:
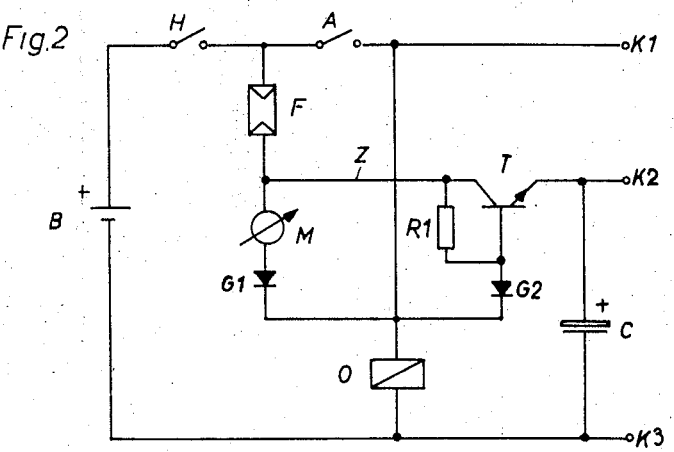
FIG. 2 shows a modified circuit in which the delay circuit is fed through an electronic switch and in which the meter is turned off by operating the release switch.

The embodiment of FIG. 2 relates to a circuit which in principle corresponds to FIG. 1, the only modification being the insertion of an electronic switch, such as a transistor T, in branch Z ahead of capacitor C. Said transistor is maintained in a nonconductive condition until the release switch A is operated. Thus, there can be no initial charge on the capacitor C before operation of the release switch A, which is advantageous in selecting the parameters of the circuit. The electronic switch in this embodiment of the invention comprises a transistor T, the base of said transistor being connected to its collector through the resistor R1. When the main switch H is closed and the release switch A is open, the base of the transistor T is practically at the same potential as the terminal K3 (zero potential) since current from said photoresistor F flows through said rectifier G1 in the normal direction of flow, whereby the current across resistor R1 is negligibly small since the resistor R1 has a high resistance with respect to the resistance of the meter M. If the release switch A is then operated, the shutter opening magnet O, as illustrated in the circuit of FIG. 1, receives the entire voltage of the battery B, the rectifier G1 being blocked at the same time which thus causes the current flowing through the photoresistor F to flow through the branch Z. By blocking the rectifier G1, the rectifier G2 is also blocked since its side is connected to the shutter opening magnet O and receives a more positive potential than its other side. Therefore, a positive potential can then be conducted through the resistor R1 to the base of transistor T, said positive potential causing the transistor to be conductive so that the current flowing through the photoresistor F and the branch Z is supplied to the capacitor C. The same operations as above described and illustrated in FIG. 1 are performed at the terminals K1, K2 and K3 so that reference can be made thereto.

Due to the separation of the delay circuit by means of the transistor T during measurement of the current flowing through the photoresistor F by the meter M, the indicating characteristic of said meter can be favorably influenced in a simple manner. If one assumes a linearly operating meter M and a resistance value for the photoresistor F which value changes in proportion to the incident light, a doubling of the intensity of illumination results in a halving of the resistive value of the photoresistor F and also of the reading of the meter M. This has the result that, for short exposure times, widely spaced-apart readings of the meter M are obtained, in comparison to which the reading values for long exposure times are close together. If an ohmic resistance is inserted behind the branch Z in the current branch containing the meter M, with value of said ohmic resistance being approximately the magnitude of the resistive value of the photoresistor F at high intensities of illumination, then the current through the meter M at changing intensities of illumination no longer changes proportionally to same, which thus makes it possible to divide more equally the scale of the meter M. The voltage drop on the resistance during measuring of the current by means of meter M can thereby not influence the delay circuit since same is maintained separate by the transistor T during said time.

In the circuit of FIG. 2, in which upon operation of the release switch a switching of current flow to the branch Z takes place so that substantially no current is supplied to the meter M, the above-mentioned ohmic resistance can be produced simply by forming same through the inner resistance of the meter M.

It is of course also possible to provide the above mentioned resistance in front of the branch Z. However, this influences the current fed through the photoresistor F of the delay circuit, which of course could make the design of the delay circuit, in particular of the threshold value switch W connected thereto (compare FIG. 2), somewhat difficult.

Figure 3:
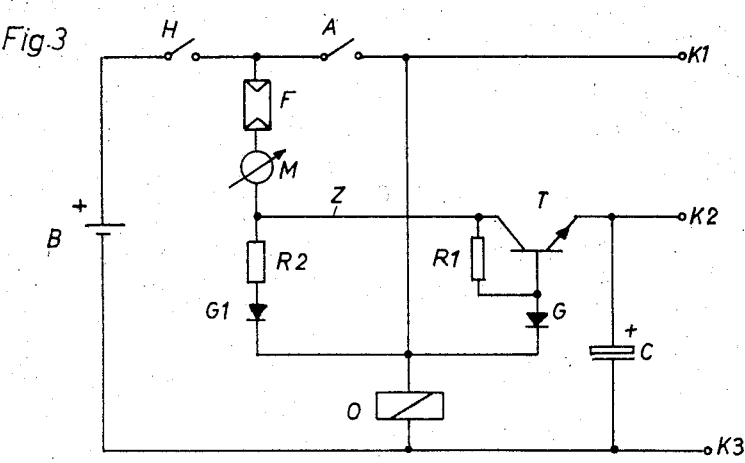
FIG. 3 shows a modification of the circuit of FIG. 2 in which the meter remains turned on after the release switch has been closed.

FIG. 3 illustrates a modification of the circuit of FIG. 2. The branch Z is provided in such a way that, as in the circuit of FIG. 1, after switching of the current to the branch Z, due to the operation of the release switch A, current continues flowing through the meter M. Otherwise the function of said circuit is the same as the function of the circuit of FIG. 2.

The ohmic resistance which is used to improve the indicating characteristic of the meter M is also provided in the circuit according to FIG. 3, namely as resistor R2. Said resistor is positioned below the branch Z so that its presence does not influence the charging of the delay circuit. Before the switching of the current to the delay circuit, said delay circuit is still separated through the transistor T and, after the switching of the current, the branch of the circuit containing the resistor R2 is currentless due to the blocking of the rectifier G1. An additional control of the exposure process is made possible by incorporating the meter M into the circuit for charging the delay circuit, as provided in FIG. 3. By operating the release switch A, the meter M is not turned off so that, in particular during long exposure times, the charging current which determines the exposure times and which is fed to the delay circuit can be observed through the meter M.

The embodiments of the invention in which an exclusive property or privilege is claimed are defined as follows:

1. A light exposure control circuit for a photographic shutter, comprising:

electromagnetic means including a shutter opening magnet for causing the opening and a shutter closing magnet for causing the closing of the shutter the exposure time of which is indicated on an electric meter, said meter is connected to a photoresistor and can be switched on by means of a first operated main switch;

a delay circuit including the photoresistor and a capacitor to determine the exposure time and in which said capacitor of said delay circuit, starting with the energizing of the shutter opening magnet, is charged through the photoresistor until, at the end of the delay time, the shutter closing magnet is energized;

a first branch including the meter and the photoresistor, a second branch including a rectifier and the shutter opening magnet, and a third branch including said capacitor and the shutter closing magnet, said main switch, the first branch and the second branch being connected across power source;

wherein said first branch of the light exposure control circuit containing the meter and the photoresistor discharges through said rectifier of the second branch of the light exposure control circuit containing the shutter opening magnet, the latter branch being energized by means of a release switch operated after the operation of the main switch, operation of the release switch causing the rectifier to be blocked whereby all the current flowing through the photoresistor is fed to the capacitor of said delay circuit, the capacitor of said delay circuit being contained in said third branch of the light exposure control circuit connected between said rectifier and said photoresistor.

2. An electrical light exposure control circuit according to claim 1, wherein the shutter opening magnet is connected to the output side of the rectifier in such a way that the voltage drop occurring at the shutter opening magnet when the release switch is in operation is used for blocking the rectifier.

3. An electrical light exposure control circuit according to claim 1, wherein the release switch closes the circuit for the shutter closing magnet.

4. An electrical light exposure control circuit according to claim 1, wherein an electronic switch having a control electrode is connected in the third branch, the control electrode of said switch being connected with the discharge of the first branch and having a further rectifier connected thereto with operation of the release switch blocking said further rectifier whereby the electronic switch becomes conductive.

5. An electrical light exposure circuit according to claim 1, wherein the third branch is connected to the first branch in such a way that the current fed to said third branch also flows through the meter.

6. An electrical light exposure control circuit according to claim 1, wherein the third branch is connected to the first branch in such a way that the current fed to the third branch does not flow through the meter.

7. An electrical light exposure control circuit according to claim 4, wherein the electronic switch consists of a transistor, the base of which is connected to its collector through a resistor.

8. An electrical light exposure control circuit according to claim 1, wherein the branch of the circuit containing the meter contains an ohmic resistance, the value of which lies in the magnitude of the resistive value of the photoresistor at high intensities of illumination.

9. An electrical light exposure control circuit according to claim 8, wherein said above-mentioned resistance is positioned behind the third branch.

10. An electrical light exposure control circuit according to claim 8, wherein said resistance is formed by the internal resistance of the meter.

References Cited

UNITED STATES PATENTS

| | | | |
|---|---|---|---|
| 3,205,795 | 9/1965 | Grey | 95—10 |
| 3,362,311 | 1/1968 | Singer | 95—53 |
| 3,020,816 | 2/1962 | Frenk | 95—58 |

J D MILLER, Primary Examiner

C. L. YATES, Assistant Examiner

U.S. Cl. X.R.

95—10